INVENTORS:
DOUGLAS A.C. DE RYCKE
OWEN G. PARKER
ATTORNEYS

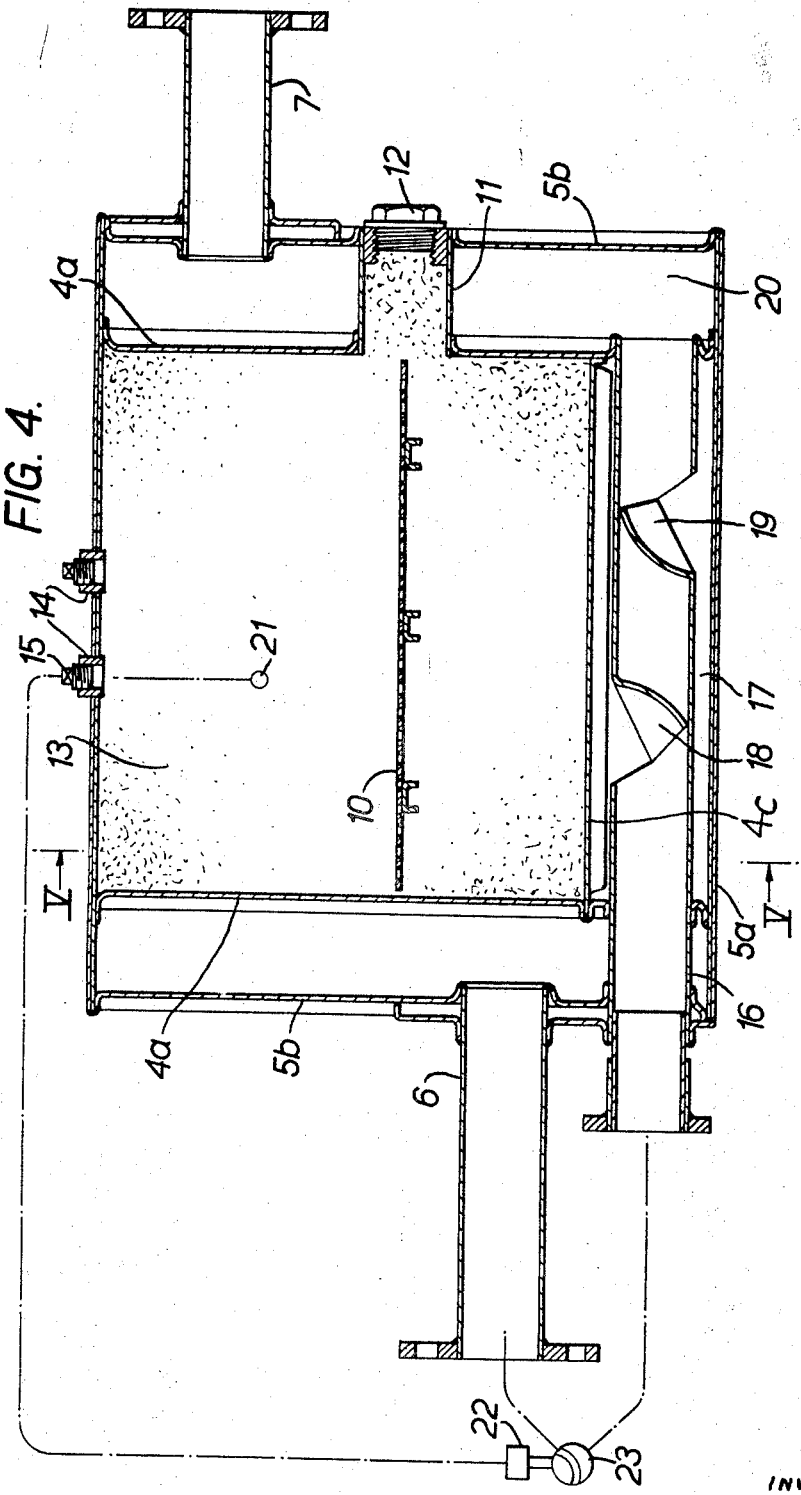

3,434,806
CATALYTIC MUFFLER
Douglas August Charles De Rycke, Woolton, Liverpool, and Owen Gordon Parker, Stoke Golding, Nuneaton, England, assignors to Peter Spence & Sons Limited, Widnes, Lancashire, England, and Burgess Products Company Limited, Hinckley, Leicester, England
Filed Mar. 8, 1965, Ser. No. 438,016
Claims priority, application Great Britain, Mar. 11, 1964, 10,172/64
Int. Cl. B01j 9/04
U.S. Cl. 23—288      2 Claims

ABSTRACT OF THE DISCLOSURE

A catalyst converter for an exhaust system includes a catalyst chamber located within a container having inlet and outlet chambers at its opposite ends. An internal brace separates the catalyst chamber into two compartments which are arranged to be filled simultaneously. A modification includes a separate inlet pipe which extends through a silencing chamber in the container to the outlet chamber. The separate inlet pipe is blocked and ported at two locations within the silencing chamber so that exhaust gases bypassing the catalyst chamber will circulate through the silencing chamber.

---

This invention relates to the exhaust systems of internal combustion engines and is particularly concerned with a catalyst container or converter for use in such systems. Such containers are used to reduce the amount of combustibles such as hydrocarbons and/or carbon monoxide in the exhaust gas stream discharged to the atmosphere.

In one conventional form of the container, the exhaust gases pass downwards through a bed of catalyst in the container which may be arranged in series with an automobile exhaust pipe and can also serve as a silencer. The catalyst bed may be housed in a chamber arranged within the container.

According to the present invention, the catalyst chamber is provided with an internal bracing member which divides the chamber into two compartments and the container is provided with filling means for the chamber so disposed in relation to the bracing member that catalyst may be supplied simultaneously to both compartments of the chamber via the filling means.

In a preferred form of the invention, inlet and outlet means for the container are disposed adjacent to the base of the container whereby maximum road clearance of the container may be obtained. In addition, the inlet and outlet means may be laterally staggered so as to increase the length of path of the exhaust gases through the catalyst container whereby silencing may be improved.

To prevent excessive temperatures developing in the catalyst bed when the catalyst container is in use, it is advantageous to arrange that the exhaust gases bypass the catalyst bed when a predetermined temperature is reached in the bed. Thus, a temperature sensitive element may be included in the catalyst bed and may be arranged to actuate a valve which causes the exhaust gases to bypass the catalyst bed when the predetermined temperature is reached. The gases may bypass the catalyst bed by passing through a silencer separate from the catalyst container, but in a preferred arrangement, the gases are taken directly to the exit side of the catalyst bed.

Thus the catalyst container may be provided with two inlet tubes, one of which communicates with the inlet side of the catalyst bed and the other of which passes via silencing means directly to the outlet side of the catalyst bed.

Figure 1:
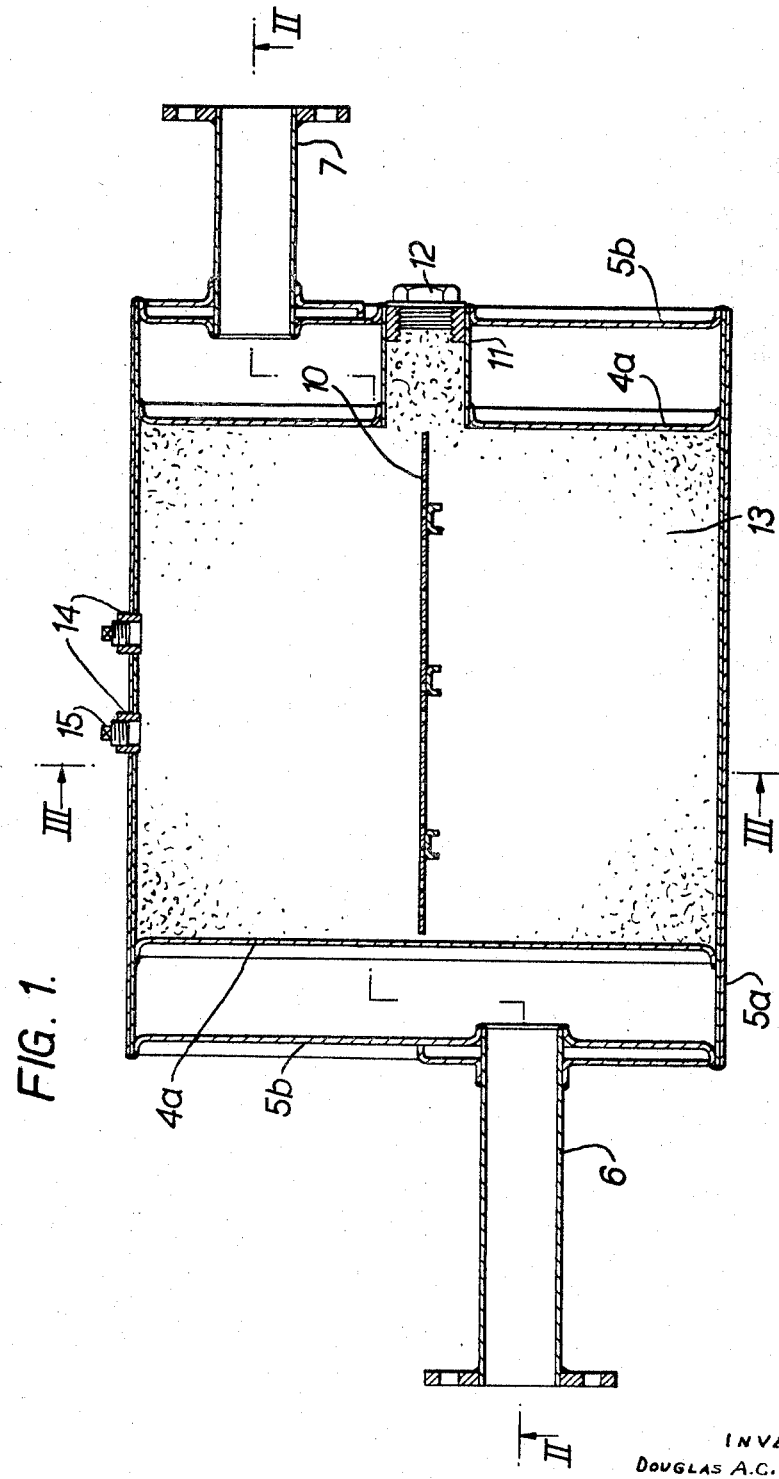
Figure 2:
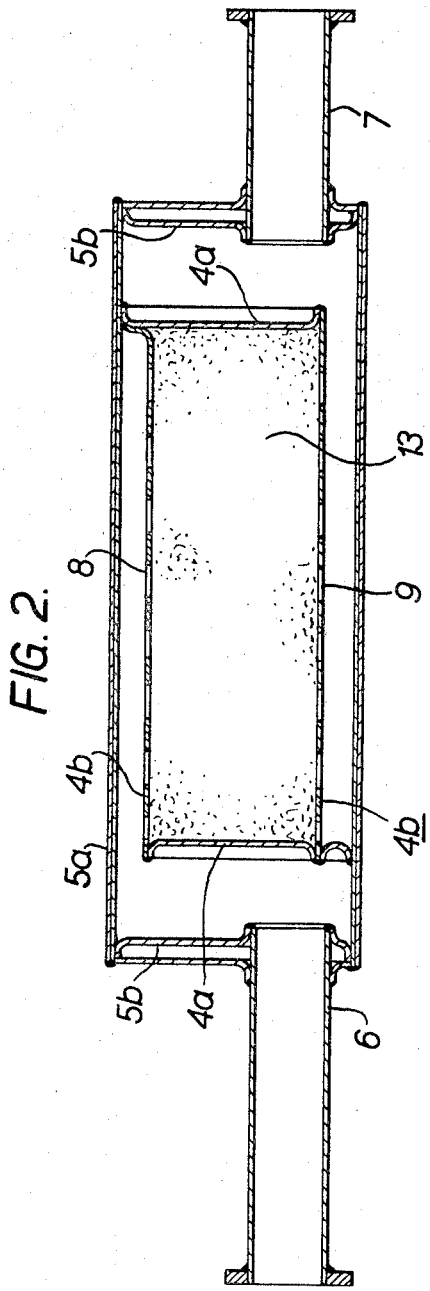
Figure 3:
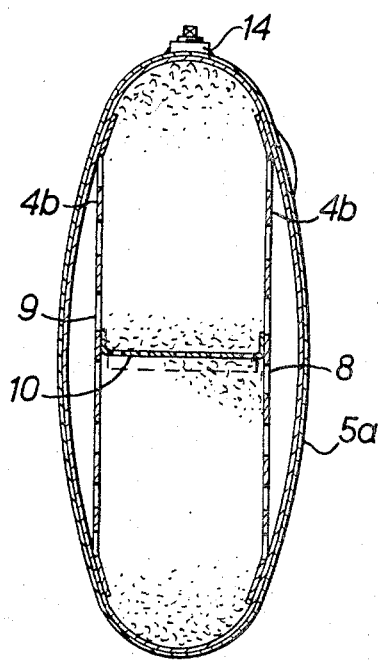
Figure 5:
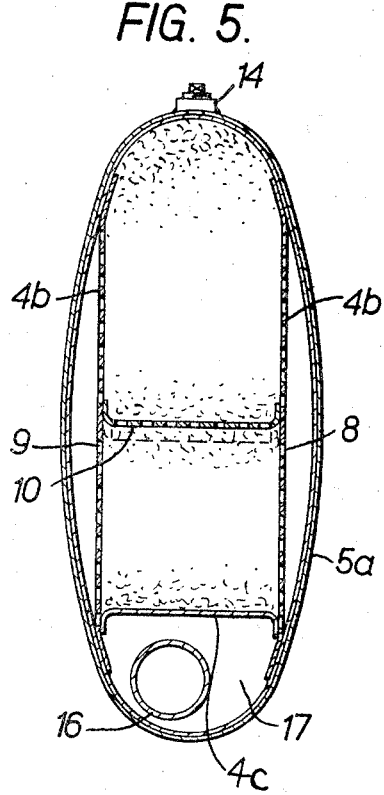

The invention will now be further described by way of example with reference to the accompanying drawings in which:

FIG. 1 is a plan view in section of a catalyst container for an automobile exhaust system,
FIG. 2 is a section taken on the line II—II of FIG. 1,
FIG. 3 is a section taken on the line III—III of FIG. 1,
FIG. 4 is a plan view in section of a modified form of catalyst container incorporating a bypass, and
FIG. 5 is a section taken along the line V—V of FIG. 4.
In the drawings like numbers refer to like parts.

In FIGS. 1 to 3, a catalyst chamber having walls 4a, 4b is arranged within a catalyst container consisting of a shell 5a of substantially elliptical cross-section and having a width at least twice its height, and a pair of closure members 5b for the ends of the shell. The closure members carry inlet and outlet pipes 6 and 7 respectively disposed adjacent to the base of the container so that the presence of the catalyst container in the automobile exhaust system does not substantially affect the road clearance of the exhaust system. The portion of the container extending above the inlet and outlet pipes may be accommodated in a well in the automobile disposed for example under the front passenger seat.

The walls 4b of the catalyst chamber are perforated at 8 and 9 to permit the passage to exhaust gases through the catalyst chamber in a downward direction from the inlet pipe to the outlet pipe. As may be seen from FIG. 1 the inlet and outlet pipes 6 and 7 are laterally staggered so as to increase the path of the exhaust gases through the catalyst chamber while not introducing any further abrupt changes in the path of the exhaust gases through the catalyst chamber.

Owing to its shape, which is desirable to provide a bed of catalyst, the catalyst chamber is provided with an internal bracing member 10 which divides the catalyst chamber into two compartments. The catalyst chamber is also provided with a neck 11 which extends through one of the closure members 5b and is closed by a filling cap 12. The neck 11 is so disposed in relation to the bracing member 10 that on removal of the cap 12 both compartments of the catalyst chamber may be filled simultaneously with catalyst material 13 passing through the neck 11.

For test purposes, the catalyst container may be provided with sockets 14 to receive a thermocouple or like temperature sensitive element. When not in use these sockets may be closed by plugs 15. The sockets are located in that portion of the catalyst chamber which coincides with the wall of the catalyst container.

The construction shown in FIGS. 4 and 5 differs from that shown in FIGS. 1 to 3 in that the catalyst chamber is formed by walls 4a, 4b and 4c and the container is provided with a second inlet pipe 16 which extends through a silencing space or chamber 17 formed at one side of the catalyst chamber by the walls 4a, 4c and the shell 5a. The pipe 16 is blocked at 18 and 19 by making a V-shaped cut in the tube at each of these points and pushing the portion of tube defined by each V into the tube. Exhaust gases entering the pipe 16 therefore leave it at 18, pass through the space 17 and reenter the tube at 19. The pipe 16 terminates inisde the catalyst container at the outlet space 20 and hence bypasses the catalyst chamber. By blocking the tube at 18 and 19 and causing the gases to be diverted through the space 17, the gases bypassing the catalyst chamber are adequately silenced and on leaving the inner end of the inlet pipe 16 pass directly into the outlet space 20 and out of the catalyst container via the outlet pipe 7.

A temperature sensitive element 21 may be located in the catalyst chamber. This element, acting through a control box 22, actuates a control valve 23, the setting of which determines whether exhaust gases passing through the control valve are directed to the inlet pipe 6 or the inlet pipe 16. If the temperature in the catalyst chamber is below a predetermined value, the valve 23 is automatically set to direct the exhaust gases to the inlet pipe 6 and hence through the catalyst chamber, whereas if the temperature in the catalyst chamber exceeds a predetermined value, the valve 23 is set to direct the exhaust gases to the inlet pipe 16 so that they bypass the catalyst chamber and prevent excessive temperatures developing therein.

We claim:

1. A catalytic converter for the exhaust system of an internal combustion engine, said converter comprising an outer shell of substantially elliptical cross section and having a width at least twice its height; a pair of closure members for the ends of said shell; a first pair of wall members mounted in said shell inwardly of said closure members; a second pair of wall members mounted in said shell inwardly of the top and base of said shell; an additional wall member mounted in said shell inwardly of one of the sides of said shell, said first and second pairs of wall members and said additional wall member being arranged to form with the other of the sides of said shell a chamber for catalyst and the additional wall member forming with the first-mentioned side of the shell and with the first pair of wall members a silencing chamber; one of said closure members, one wall member of the first pair, one wall member of the second pair and the top of the shell enclosing a gas inlet space, and the other of said closure members, the other wall member of the first pair, the other wall member of the second pair and the base of said shell enclosing a gas outlet space; passage means located in each of the wall members of the second pair to permit the passage of gases from the gas inlet space via the catalyst chamber to the gas outlet space; inlet and outlet pipes mounted in said closure members and extending outwardly therefrom to permit the passage of gas into said gas inlet space and from said gas outlet space respectively; a bracing member arranged within said chamber to support the second pair of wall members and to divide said chamber into two compartments; a filling pipe mounted adjacent to the bracing member in one of the wall members of the first pair and extending outwardly through one of said closure members to provide communication between the outside of the converter and the chamber, said filling pipe being disposed to permit the supply of catalyst simultaneously to both compartments via said filling pipe; and an additional inlet pipe mounted in the same closure member as the first-mentioned inlet pipe and passing through both wall members of the first pair and said silencing chamber to said gas outlet space, said additional inlet pipe being arranged to by-pass said gas inlet space and said catalyst chamber and being blocked and ported to cause inlet gas to flow from said inlet pipe through said silencing chamber and through a further portion of said inlet pipe to said gas outlet space.

2. A catalytic converter for the exhaust system of an internal combustion engine, said converter comprising an outer shell of substantially elliptical cross section and having a width at least twice its height; a pair of closure members for the ends of said shell; a first pair of wall members mounted in said shell inwardly of said closure members; a second pair of wall members mounted in said shell inwardly of the top and base of said shell; an additional wall member mounted in said shell inwardly of one of the sides of said shell, said first and second pairs of wall members and said additional wall member being arranged to form with the other of the sides of said shell a chamber for catalyst and the additional wall member forming with the first-mentioned side of the shell and with the first pair of wall members a silencing chamber; one of said closure members, one wall member of the first pair, one wall member of the second pair and the top of the shell enclosing a gas inlet space, and the other of said closure members, the other wall member of the first pair, the other wall member of the second pair and the base of said shell enclosing a gas outlet space; passage means located in each of the wall members of the second pair to permit the passage of gases from the gas inlet space via the catalyst chamber to the gas outlet space; inlet and outlet pipes mounted in said closure members and extending outwardly therefrom to permit the passage of gas into said gas inlet space and from said gas outlet space respectively; a bracing member arranged within said chamber to support the second pair of wall members and to divide said chamber into two compartments; a filling pipe mounted adjacent to the bracing member in one of the wall members of the first pair and extending outwardly through one of said closure members to provide communication between the outside of the converter and the chamber, said filling pipe being disposed to permit the supply of catalyst simultaneously to both compartments via said filling pipe; an additional inlet pipe mounted in the same closure member as the first-mentioned inlet pipe and passing through both wall members of the first pair and said silencing chamber to the gas outlet space, said additional inlet pipe being arranged to by-pass said gas inlet space and said catalyst chamber and being blocked and ported to cause inlet gas to flow from said inlet pipe through said silencing chamber and through a further portion of said inlet pipe to said gas outlet space; a temperature sensitive element mounted in said catalyst chamber; and a control valve for said first-mentioned inlet pipe and said additional inlet pipe, said temperature sensitive element being arranged to actuate said control valve to close said first mentioned inlet pipe when said element reaches a predetermined temperature.

References Cited

UNITED STATES PATENTS

| | | | |
|---|---|---|---|
| 2,834,657 | 5/1958 | Houdry | 23—288.3 F |
| 3,090,677 | 5/1963 | Scheitlin et al. | 23—288.3 F |
| 3,100,140 | 8/1963 | Ashley et al. | 23—288.3 F |
| 3,146,073 | 8/1964 | Johnson | 23—288.3 F |
| 3,149,925 | 9/1964 | Scheitlin | 23—288.3 F |
| 3,167,400 | 1/1965 | Fisher | 23—288.3 F |
| 3,186,804 | 6/1965 | Fisher | 23—288.3 F |

JOSEPH SCOVRONEK, *Primary Examiner.*

U.S. Cl. X.R.

181—36, 56